Jan. 27, 1925.

C. BORNMANN

PHOTOGRAPHIC SHUTTER

Filed Sept. 2, 1922

1,524,081

INVENTOR
CARL BORNMANN
BY
Philip S. Hopkins
ATTORNEY

Patented Jan. 27, 1925.

1,524,081

UNITED STATES PATENT OFFICE.

CARL BORNMANN, OF BINGHAMTON, NEW YORK, ASSIGNOR TO ANSCO PHOTOPRODUCTS, INC., OF NEW YORK, N. Y., A CORPORATION OF NEW YORK.

PHOTOGRAPHIC SHUTTER.

Application filed September 2, 1922. Serial No. 586,001.

*To all whom it may concern:*

Be it known that I, CARL BORNMANN, a citizen of the United States, and a resident of the city of Binghamton, county of Broome, and State of New York, have invented a new and useful Improvement in Photographic Shutters, of which the following is a description, reference being had to the accompanying drawings, in which like reference numerals indicate like parts.

The principal object of my invention is to provide a cushion stop for the shutter plate of a photographic camera. Heretofore rigid stops have been used for this purpose, and have proven very unsatisfactory due to the rebound given the shutter plate. This rebound frequently causes the shutter plate to fly back far enough to uncover the lens and thus destroy the exposure which has just been made.

A further object is to provide a single stop member which operates in the same manner upon the shutter plate in either of its two positions, thus eliminating unnecessary material and labor.

A third object is to utilize the pivot pin of the shutter operating lever in providing the shutter stop, the advantages of which will readily appear.

Other objects and advantages in details of construction and operation will appear as the description proceeds.

My invention is an improvement over U. S. Patent Number 1,185,283—granted to C. Bornmann and E. C. Clark May 30, 1916.

Figure 1:
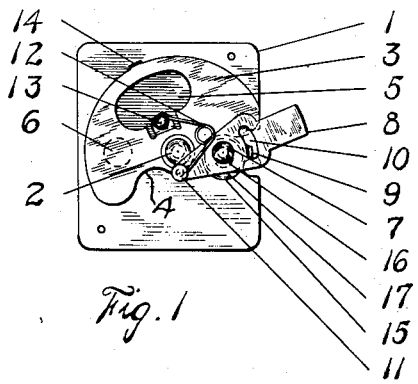
Figures 1 and 2 are plan views of the complete shutter showing the shutter plate in its two positions of rest.

In the drawings, 1 indicates the base plate of the shutter which is secured in any suitable manner to the shutter board of the camera (not shown). Pivoted at 2 upon this base, substantially centrally thereof, is a shutter plate 3 of semicircular configuration, having rounded shoulders thereon for a purpose hereinafter described. The shutter plate 3 is provided with an aperture 5 which passes over an aperture 6 in the base, upon oscillation of said shutter plate, thus permitting light to enter the camera for the purpose of making an exposure in a well known and familiar manner.

Pivoted on a pin 7 on the base 1 is a shutter actuating lever 8. It is to be noted that the pivot pin 7 is in the path of movement of the shutter plate 3 for a purpose to be described. An upstanding lug 9 is struck from the base, and extends upwardly through a slot 10 in the lever 8, whereby the lever 8 is limited in its movement by said lug. The inner end of the lever 8 carries an anchor pin 11 to which one end of the spring 12 is attached; the other end of said spring being secured to an upstanding lug 13 struck from the base at one edge of the aperture 5. 14 designates a lug struck up at the edge of the shutter plate, centrally thereof, which lug cooperates with the "time" exposure lever (not shown) in a well known manner. The shutter plate 3 is spaced from the base 1 by any suitable means as by a spring washer or by an indentation struck in said plate 3 around the pivot thereof.

The operation of the parts just described is familiar to those skilled in the art and needs no detailed description. When the lever 8 is swung on its pivot in either direction, the spring 12 acts to throw the shutter plate 3 to its opposite position with a quick snap movement, during which movement the apertures 5 and 6 coincide and admit light as described.

Mounted upon the pivot 7 and resting on the base 1 is a circular washer 15. The opening 16 in said washer which fits over the pin 7 is larger than said pin, permitting a horizontal sliding movement relative thereto. During such movement said washer slides frictionally on the base 1.

Also mounted on the pivot pin 7 and resting on the washer 15 is a spring 17. In the form shown, this spring is a circular spring washer, although it is to be understood that other types of springs may be used, for instance a coil spring. The spring 17 bears against the underside of the actuating lever 8 and is tensioned thereby, thus holding the washer 15 frictionally against the base. This arrangement of parts comprises the cushion stop for the shutter plate and provides a very efficient means for gradually stopping said shutter plate and preventing rebound thereof.

Figure 2:
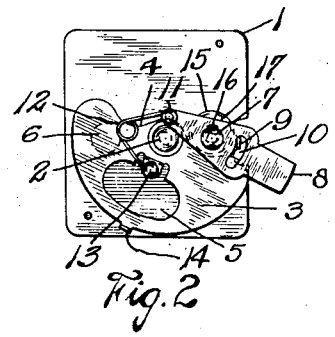
Figure 3:
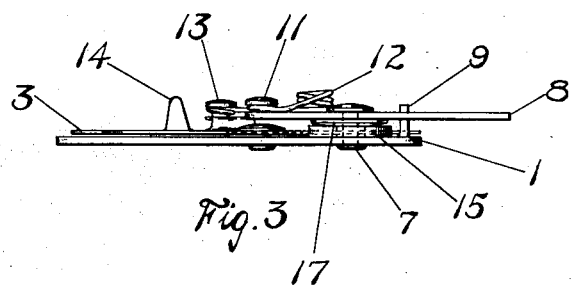
Figure 3 is a side view of the shutter as shown in Figure 1.
Figure 4:
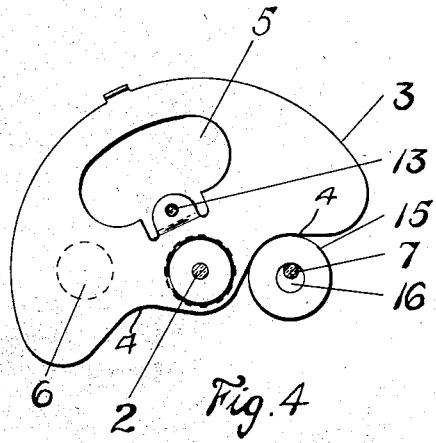
Figures 4 and 5 are enlarged details showing the action of the shutter plate on the cushion stop.
Figure 5:
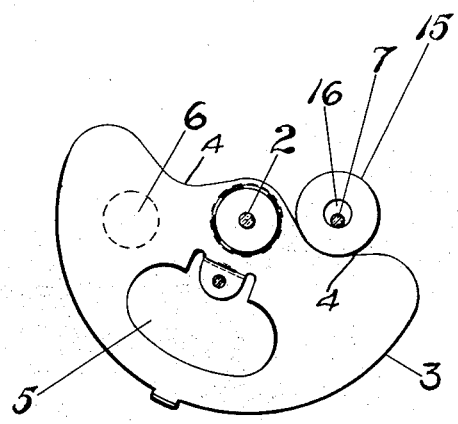
Figure 6:
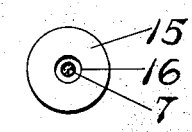
Figure 6 is a detail.

The operation of the device is as follows: When the lever 8 is swung on its pivot, the shutter plate 3 is snapped with considerable force from one position, shown in Fig. 1, to the other, shown in Fig. 2. One of the rounded edges 4 of said plate, depending upon the direction of movement of the plate, strikes the washer 15 near the limit of movement of said plate. The spring 17 permits the washer 15 to frictionally slide on the base until the edge of the opening 16 comes in contact with the spring pin 7, thus stopping the plate.

It will be seen that I have provided a simple, yet efficient stop for the shutter plate, which gradually stops the plate at the limit of its movement in either direction, thus avoiding the detrimental rebound, common where rigid stops are used.

While the embodiment illustrated and herein described is the preferred form of my invention, it is to be understood that the same is susceptible to various changes in details of construction and parts and I do not therefore limit myself to the exact form as shown other than by the appended claims.

I claim:

1. In a photographic shutter comprising in combination a movable shutter plate, a manually operated pivoted lever for actuating said plate, the pivot of said lever being in the path of movement of said shutter plate whereby said plate is limited in its movement.

2. In a photographic shutter comprising in combination a movable shutter plate, pivoted means for actuating said plate, the pivot of said means being in the path of movement of said shutter plate, and means on said pivot for gradually stopping said plate in its movement in either direction.

3. In a photographic shutter comprising in combination a base, a movable shutter plate, pivoted actuating means therefor, the pivot of said means being in the path of movement of said shutter plate, and friction means on said pivot, slidable on said base, for gradually stopping said plate in its movement in either direction.

4. In a photographic shutter comprising in combination a movable shutter plate, pivoted actuating means therefor, the pivot of said means being in the path of movement of said shutter plate, and friction means on said pivot comprising a spring controlled washer, for gradually stopping said plate in its movement in either direction.

5. In a photographic shutter comprising in combination a movable shutter plate, a pivoted actuating lever therefor, the pivot of said lever being in the path of movement of said shutter plate, a circular washer mounted on said pivot the opening of which is larger than said pivot, and a spring between said washer and said lever whereby the plate will be gradually stopped at the limit of its movement in either direction by engagement with said washer.

6. In a photographic shutter comprising in combination with a movable shutter plate and pivoted actuating means therefor, a yielding stop for said plate frictionally mounted on the pivot of said actuating means for sliding movement thereon.

7. In a photographic shutter comprising in combination with a base, a movable semi-circular shutter plate having rounded shoulders, and a pivoted actuating means therefor, a yielding stop for said plate comprising a circular member frictionally mounted on the pivot of said actuating means, for engagement with said rounded shoulders.

8. In a photographic shutter comprising in combination with a base, a movable shutter plate, and pivoted actuating means therefor, a stop for said plate comprising a washer frictionally mounted on the pivot of said actuating means, and a spring between said washer and said actuating means.

CARL BORNMANN.